Figure 4:
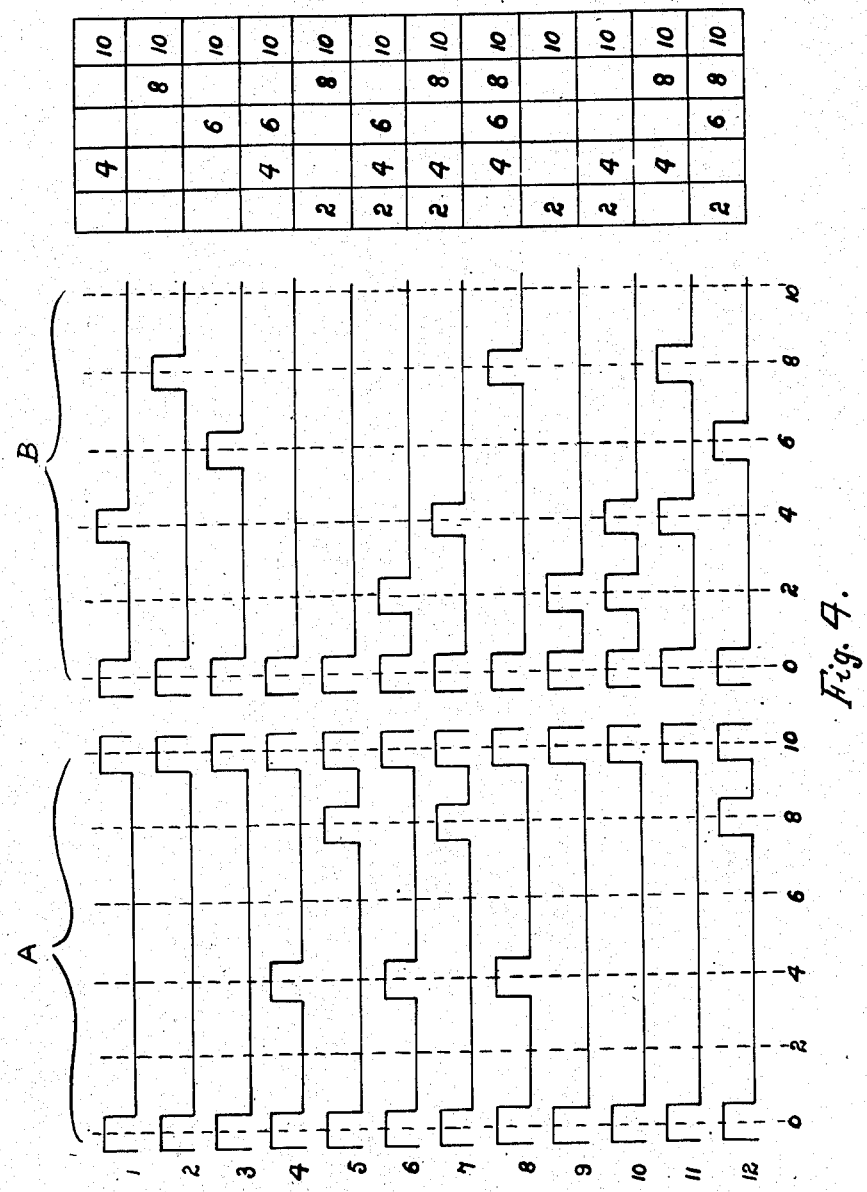

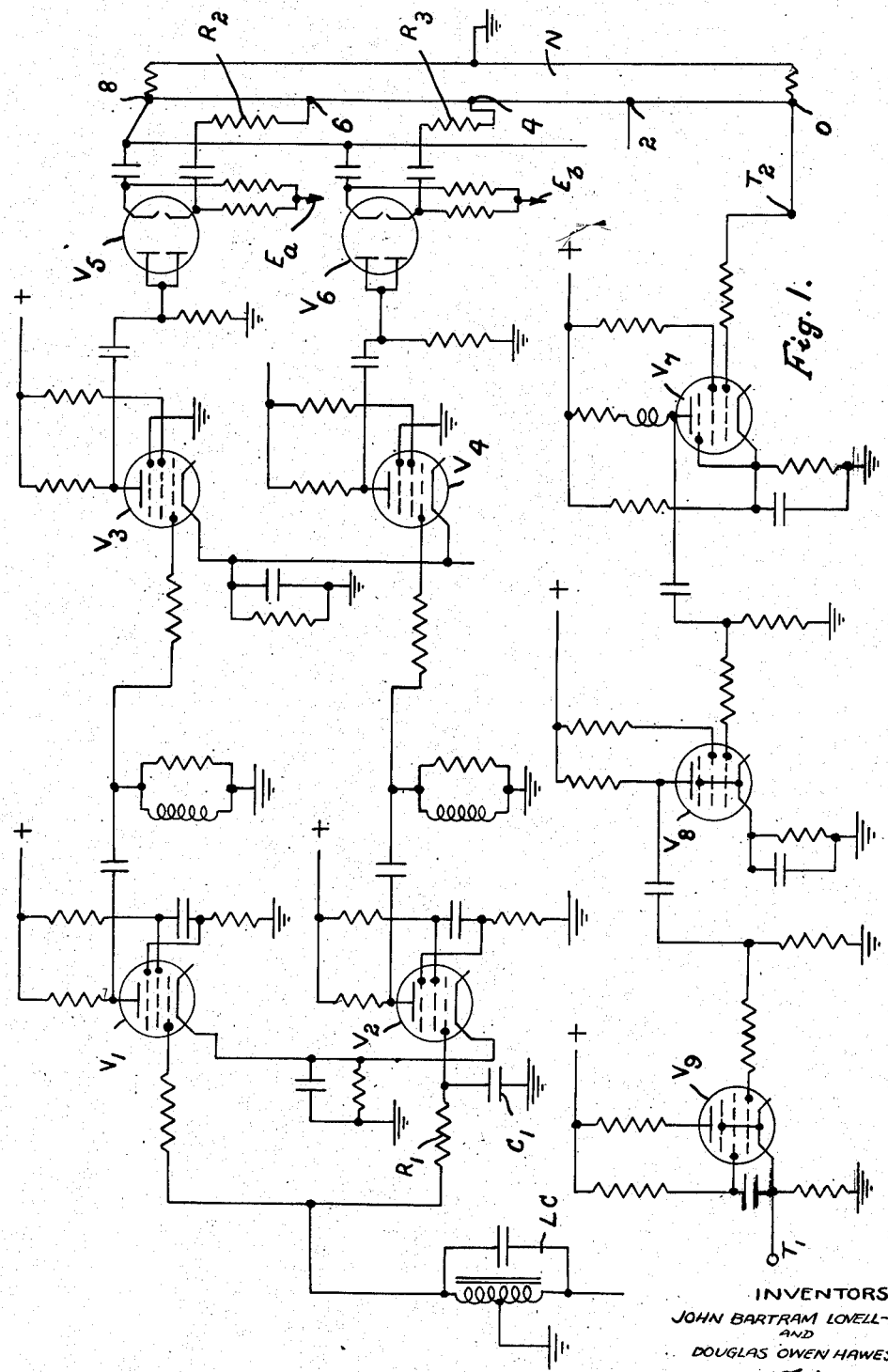

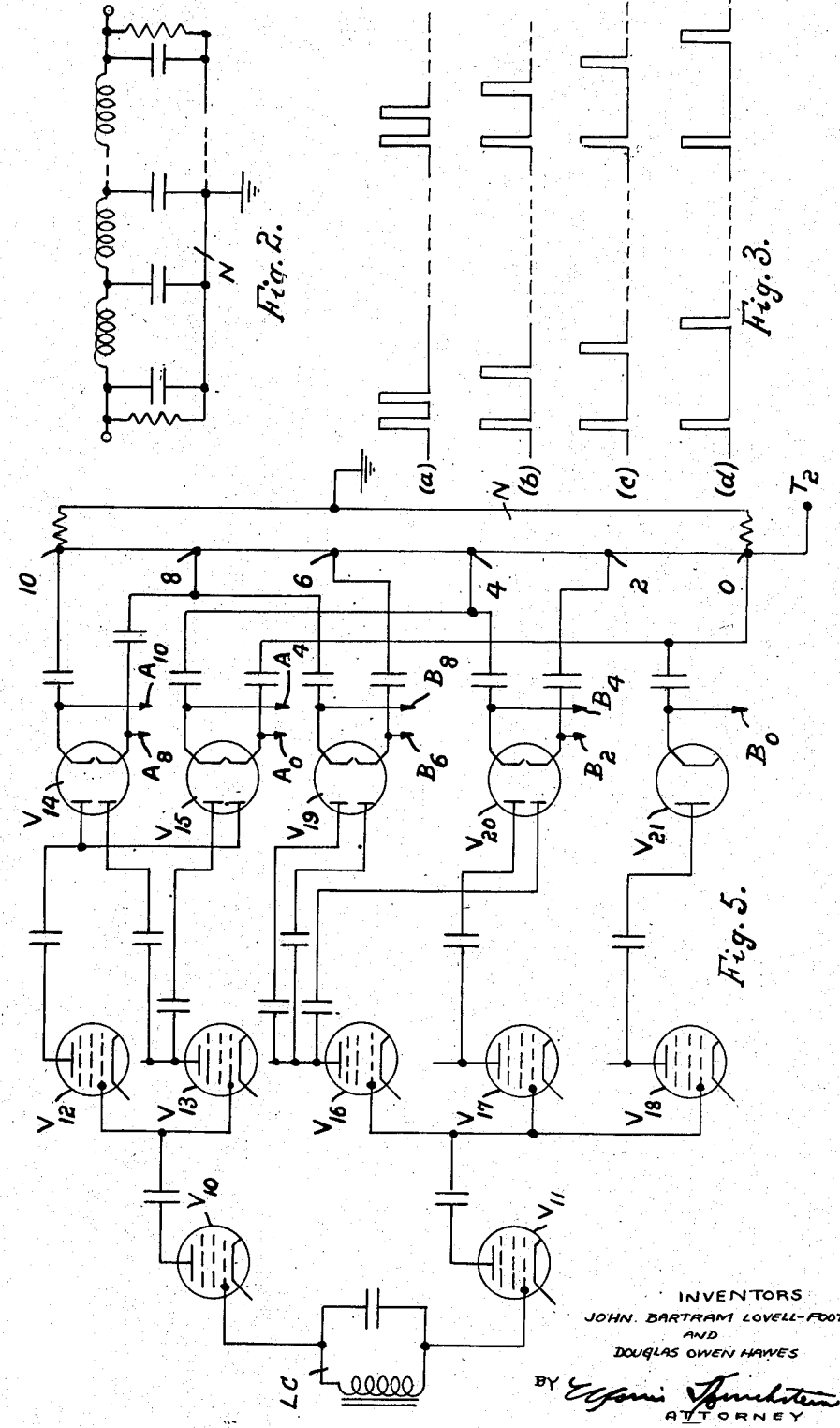

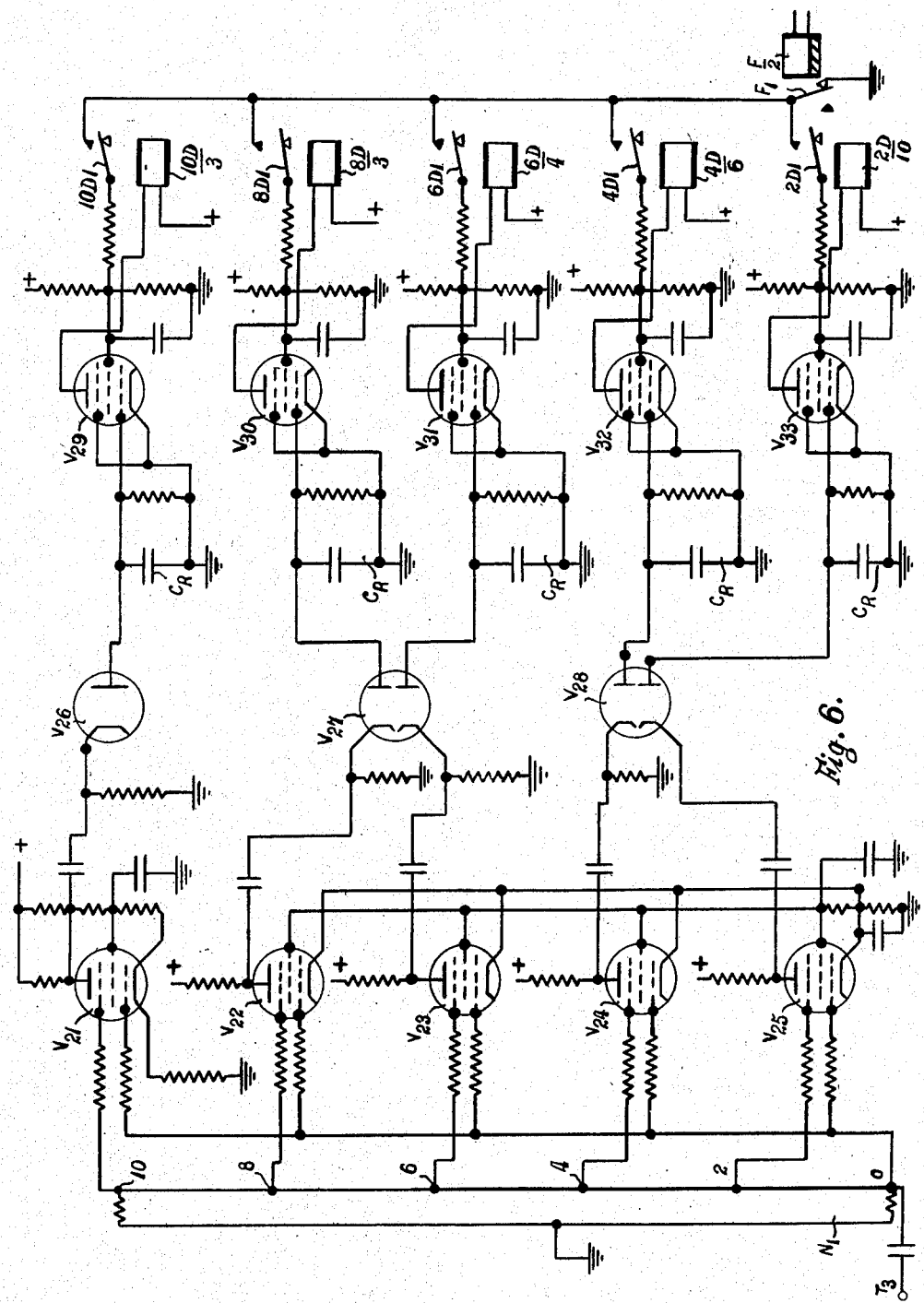

Patented Nov. 11, 1952

2,617,873

UNITED STATES PATENT OFFICE 2,617,873

REMOTE-CONTROL SYSTEM

John Bartram Lovell-Foot, Northwood, and Douglas Owen Hawes, London, England, assignors to The General Electric Company Limited, London, England Application June 12, 1946, Serial No. 676,186
In Great Britain June 22, 1945

17 Claims. (Cl. 177—353)

The present invention relates to signalling systems for the communication of intelligence and more particularly, but not exclusively, to remote control systems.

It is the principal object of the present invention to provide a signalling system, suitable for remote control purposes, which is certain in operation and in which the risk of reception of incorrect intelligence is small.

According to the present invention, apparatus for the communication of intelligence, for example for remote control purposes, comprises generating means for generating a plurality of recurrent pairs of pulses of substantially uniform amplitude and duration, said pairs having the same recurrence frequency, the time spacing of the pulses of the said pairs being different from one another and the time spacing of the most closely spaced pulses of different pairs being greater than the maximum time spacing of the pulses of any one pair, and means for selecting, according to the nature of the intelligence to be transmitted, and for transmitting, a group of pulses, each such group comprising one or more of said recurrent pairs of pulses and being representative of a different item of said intelligence.

By arranging that the pairs of pulses have the same recurrence frequency the drifting of one pair over others which may give rise to faulty operation is prevented. Since any individual item of intelligence is characterised by the time spacing of the pulses constituting the pairs, it is important to arrange that a false pulse combination within the time spacing to which the receiver is responsive is not produced by a pulse of one pair in association with a pulse of another pair. This is achieved by arranging, as stated, that the time spacing of the most closely spaced pulses of different pairs is greater than the maximum time spacing of the pulses of any one pair.

It has been found that an equivalent result with some simplification of equipment can be achieved without necessarily generating and transmitting separate discrete pairs of pulses. Thus the effect of three pairs of pulses (six pulses in all) having time spacings of 2, 3 and 5 time units respectively is equivalent to three pulses $a$, $b$ and $c$ occurring at times 0, 2 and 5 respectively since the time spacing between $a$ and $b$ is 2, that between $b$ and $c$ is 3 and that between $a$ and $c$ is 5.

According to a further feature of the present invention, therefore, apparatus for the communication of intelligence, for example for remote control purposes, comprises generating means capable of generating a plurality of recurrent groups of pulses each characteristic of a different item of intelligence, said groups having the same recurrence frequency, each said group comprising two or more recurrent pulses of substantially like amplitude and duration, said groups being distinguished by the number and time spacing of the constituent pulses thereof and the duration of each said group being small compared with the period of said recurrence, and means for selecting and transmitting one or a combination of said groups according to the intelligence to be transmitted. Where a plurality of groups are transmitted simultaneously they are arranged to be spaced apart by an interval larger than the duration of any one group.

Apparatus for the reception of signals transmitted by apparatus according to this invention comprises a plurality of channels, individual channels or different groups of channels corresponding to different items of intelligence, selective means associated with the inputs of said channels for rendering each channel operative on application to the input thereof of a recurrent pair of pulses of a different, predetermined time spacing and responsive means associated with the output of each channel for producing, when any channel or group of channels is rendered operative, an indication or other response appropriate to the item of intelligence with which the channel or group of channels is concerned.

The said selective means may be in the form of a coincidence circuit comprising a thermionic valve and a time delay network, the thermionic valve being rendered conducting, and thereby rendering operative the channel associated therewith, only when a potential above a suitable minimum value is present simultaneously on two control electrodes thereof which are connected to the input and output of the delay network respectively, the received pulses being applied to the input of the network. Thus if a particular channel is to respond to pulses having a time spacing $t$, the delay network is arranged to introduce a time delay of $t$ between its input and output. When a pair of of positive pulses having a time spacing of $t$ is received the first pulse of the pair produces no effect on the valve anode current but when the second pulse arrives at the input to the network the first pulse has reached the output thereof and hence both control electrodes of the valve are rendered more positive at the same time and the valve anode current increases and may operate a relay.

In order to reduce or eliminate the chance of false operation when the amplitude of the received pulses is low, there is preferably transmitted, with the intelligence-conveying pulses, a recurrent pair of guard pulses of distinctive time separation, these pulses having a suitably smaller amplitude than the remaining pulses or, alternatively, the selective means responsive to the guard pulses being less sensitive than the selective means responsive to the remaining pairs of pulses. The guard pulses are employed to actuate a master control which when not actuated prevents other pulses from producing any effect at the receiver.

Figure 7:
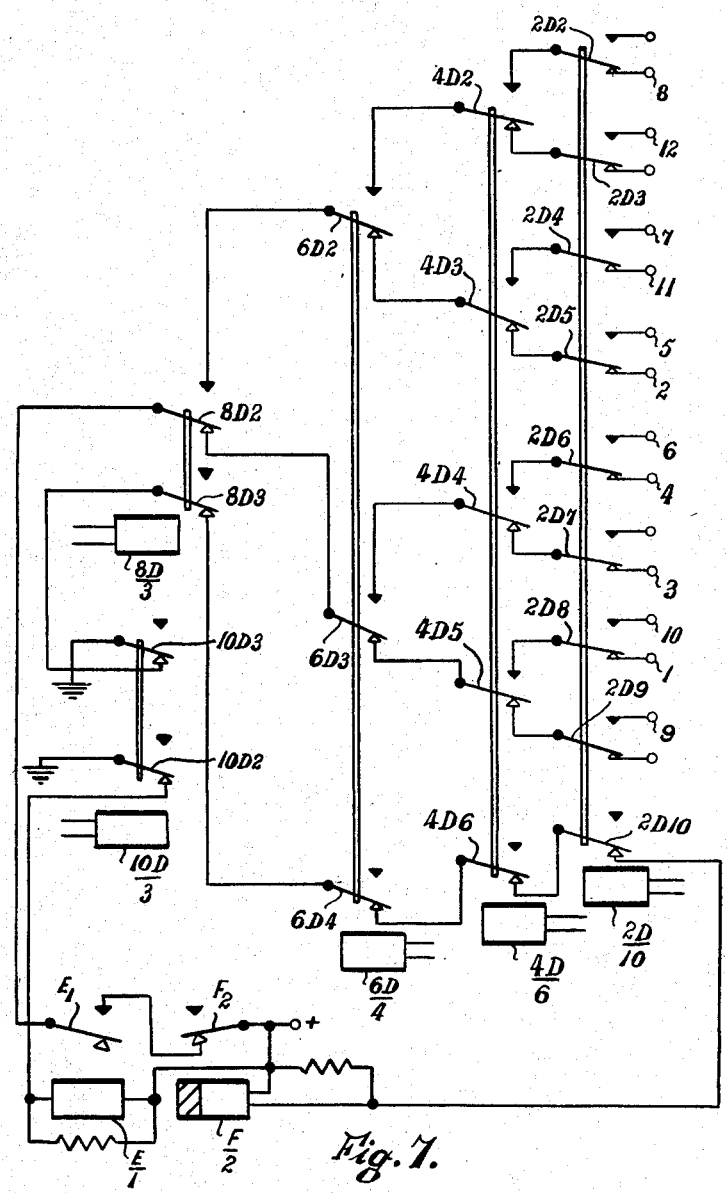

The invention will be described by way of example with reference to the accompanying drawings in which:

Fig. 1 is a circuit diagram of part of an arrangement for generating pairs of pulses according to the invention, Fig. 2 indicates a form of delay network that can be used, Fig. 3 shows the wave form of the pulses produced with the circuit of Fig. 1, Fig. 4 shows the wave form of alternative sets of pulses which produce the same effect at a suitable receiver as the pulses of Fig. 3, Fig. 5 shows parts of a circuit for generating pulses as shown in Fig. 4, Fig. 6 is a circuit diagram of a receiver for receiving pulses such as those of Figs. 3 or 4, and Fig. 7 shows a relay arrangement for use with the circuit of Fig. 6.

For convenience in description it will be assumed that pulses of 1 microsecond duration are employed, that the recurrence frequency is 200 per second and that pairs of pulses having time spacings between leading edges of 2, 4, 6 and 8 microseconds are employed. It will, of course, be understood that the invention is not in any way limited to the use of such pulses.

Referring to Fig. 1, oscillations of 200 cycles per second are generated in any suitable way in a tuned circuit LC. Voltages from the upper terminal of LC are applied to the control grids of two valves $V_1$ and $V_2$ connected to generate pulses in response to the peaks or other suitable points in the cycle of the 200 C. P. S. oscillations. The condenser $C_1$ and resistance $R_1$ associated with the control grid of the valve $V_2$ are designed to produce a suitable time delay in the pulses generated by $V_2$ compared with those generated by $V_1$. The delay may for example be about a quarter of the recurrence period, that is to say 1¼ milliseconds, but is in any case considerably larger than the largest spacing between pulses of a pair, that is, in this example, than 8 microseconds. The pulses are partly squared and amplified by the valves $V_3$ and $V_4$ and the circuits associated therewith and fed to the anodes of double diodes $V_5$ and $V_6$. The cathodes of the diodes are coupled to suitable points 8 and 6 and 8 and 4 respectively on a delay network N, which may for example be constituted as shown in Fig. 2 of series inductances and shunt condensers. The pulse channel through $V_1$, $V_3$ and $V_5$ will be referred to as the (a) channel and that through $V_2$, $V_4$ and $V_6$ as the (b) channel. Two further channels (c) and (d) are associated with the lower terminal of the circuit LC the former corresponding to the (a) channel and having no time delay and the latter corresponding to the (b) channel and having a suitable time delay introduced by elements corresponding to $C_1$ and $R_1$. Since the oscillations fed to channels (c) and (d) from LC are in anti-phase to those fed to channels (a) and (b), the pulses on the (c) and (d) channels will be delayed in time by 2½ milliseconds relatively to those in the channels (a) and (b) respectively. The diode cathodes of the (c) channel are connected to the upper end 8 of the delay network and the point 2 whilst those of the (d) channel are connected to the points 8 and 0. The total time delay of the network N is made equal to 8 microseconds and that at the tappings is made equal to the reference number thereof.

In order to compensate for the greater attenuation of the pulses which traverse the whole network N as compared with those which traverse only a part thereof or pass direct to the point 0, resistances $R_2$ and $R_3$ are inserted as shown. Corresponding resistances are provided in the connections between the (c) and (d) channels and the points 2 and 0 respectively.

Assuming that the time delay produced by the circuit $C_1R_1$ is 1¼ milliseconds, pulses will be generated in the four channels at the times 0, 1¼, 2½, 3¾ milliseconds respectively, this cycle repeating itself.

The diodes $V_5$ and $V_6$ are normally biased to be non-conducting but are rendered operative by connecting the points $E_a$ and $E_b$ respectively to earth. The channels (c) and (d) have similar points $E_c$ and $E_d$ (not shown) which are earthed when pulses therefrom are to be fed to the delay network.

The terminal $T_2$ at the lower end 0 of the delay network N is connected to a valve $V_7$ which is backed off to pass only pulses of amplitude above a predetermined lower limit, in order to avoid the risk of spurious signals being transmitted, and is also arranged to limit the pulse amplitude to some extent. The output of the valve $V_7$ is connected to two further stages $V_8$ and $V_9$, the former serving to reverse the phase of the pulses and provide additional squaring and limiting, whilst the valve $V_9$ is a cathode follower connected at terminal $T_1$ to a suitable modulator.

If the point $E_a$ only is earthed, two pulses spaced by 2 microseconds are fed to $T_1$, the earlier being that from the feed at point 6 and the later from the feed at point 8. This pair of pulses will recur at 200 cycles per second. They are therefor of the form showing in Fig. 3 at (a). Similarly when points $E_b$, $E_c$ and $E_d$ are earthed, the pulse spacings will be 4, 6 and 8 microseconds respectively as shown at (b), (c) and (d) in Fig. 3. If more than one point $E_a$ etc. be earthed simultaneously a corresponding number of pairs of pulses of different time spacing will be produced and these pairs will be interlaced owing to the time delay between the pulses fed to the delay network as already described and coincidence between pulses of different pairs is prevented.

With the four distinct pairs of pulses transmitted singly or in combination, sixteen groups each corresponding to a different item of intelligence can be transmitted. For remote control purposes this number will often be sufficient; for other purposes more may be needed and additional pairs of pulses of different time spacing may be generated. The circuit of Fig. 1 could for example be modified to deal with five pairs of pulses of different time spacing by adding a further section to the delay network N to give a total delay relative to the point 0 of 10 microseconds and an additional channel (e) could be provided. The delays in the different channels could then be suitably modified by choice of values for the components such as $C_1R_1$ in order that the five pairs of pulses occur, say, at one millisecond interval, that is to say at the times 0, 1, 2, 3 and 4 milliseconds respectively.

Any convenient means such as push button switches can be provided for earthing the points $E_a$, $E_b$ etc. selectively.

A substantial simplification of the transmitting apparatus can be achieved by generating groups of appropriately spaced pulses which, although not generated in pairs as already described, produce the same result. In an example of such a simplified circuit to be described, the requirement is for twelve distinct groups each representing a different item of intelligence and use is made of the equivalent of five pairs of pulses of time spacings 2, 4, 6, 8 and 10 microseconds, the pair with the spacing 10 microseconds forming a guard channel and being applied as will be explained later to ensure that received pulses, if below the amplitude necessary for reliable working, will not affect the responding means at the receiver.

The nature of the transmitted pulse groups will be explained with reference to Fig. 4. Two sets of pulses A and B are generated, these sets being interlaced with a time spacing much greater than that of the pulses within the sets. Twelve different groups of pulses are shown each comprising pulses from the two sets and on the right of the figure in line with each group is shown in tabular form the time spacing of the pairs of pulses to which the group corresponds. The vertical dotted lines are graduations in microseconds.

It will be observed that group 1 comprises two pulses spaced 10 microseconds apart in set A and two pulses spaced 4 microseconds apart in set B. These figures 4 and 10 are given in the table. Group 6 is more complex; here the first and second pulses of set A have the spacing 4, the second and third of the same set the spacing 6, the first and third of the same set the spacing 10 and the pulses of set B having the spacing 2.

Fig. 5 is a simplified circuit diagram of an arrangement for generating pulses as shown in Fig. 4. In this diagram all circuit details not necessary for the explanation of the operation of the arrangement have been omitted for the sake of clearness. Appropriate details will be well understood by those skilled in the art.

In Fig. 5 a circuit LC in which oscillations at a suitable frequency, for instance 200 C. P. S., are generated in any convenient way is connected as shown to the pulse generating valves $V_{10}$ and $V_{11}$ which therefore generate pulses displaced in time by 2½ milliseconds relatively to one another. The pulses from $V_{10}$ are fed to two valves $V_{12}$ and $V_{13}$ which are connected as shown to the diodes $V_{14}$ and $V_{15}$. The valve $V_{11}$ is similarly connected to the three valves $V_{16}$, $V_{17}$ and $V_{18}$ which are connected to the diodes $V_{19}$, $V_{20}$ and $V_{21}$. The diodes are rendered conducting by connection of the points $A_8$, $A_{10}$ etc. to earth. The cathodes of the diodes are connected as shown to suitable points 0, 2, 4, 6, 8 and 10 on a delay network N, the delay in microseconds being, as before, equal to the reference number and the over-all delay in this case 10 microseconds. The valves $V_{14}$ and $V_{15}$ pass pulses of the A set in Fig. 4 and the valves $V_{19}$, $V_{20}$ and $V_{21}$ pass those of the B set. The points to be earthed are given corresponding letter references, the numeral suffix indicating the time delay introduced in the passing of that pulse by the delay network.

The following table indicates the points which require to be earthed, in addition to $A_0$, $A_{10}$ and $B_0$ which are earthed each time a group is transmitted, for each of the groups shown in Fig. 4.

The reason why points $A_0$, $A_{10}$ and $B_0$ are earthed each time is that these cause the generation of pulses at 0 and 10 microseconds in the A set and that at 0 in the B set in Fig. 4. It will be observed that these three pulses are present in

| Group | Pulse spacings | Points earthed |
|---|---|---|
| 1 | 4, 10 | $B_4$ |
| 2 | 8, 10 | $B_8$ |
| 3 | 6, 10 | $B_6$ |
| 4 | 4, 6, 10 | $A_4$ |
| 5 | 2, 8, 10 | $A_8$ |
| 6 | 2, 4, 6, 10 | $A_4$, $B_2$ |
| 7 | 2, 4, 8, 10 | $A_8$, $B_4$ |
| 8 | 4, 6, 8, 10 | $A_4$, $B_8$ |
| 9 | 2, 10 | $B_2$ |
| 10 | 2, 4, 10 | $B_2$, $B_4$ |
| 11 | 4, 8, 10 | $B_4$, $B_8$ |
| 12 | 2, 6, 8, 10 | $A_8$, $B_6$ | each of the twelve groups shown. If desired, separate delay networks may be used for the pulses from the valves $V_{10}$ and $V_{11}$ respectively.

Instead of earthing the cathodes of the diodes when it is required to render them conducting, the points $A_0$ etc. may be connected, when the corresponding switch is closed, to adjustable preset tappings on a potential divider whereby the amplitude of each pulse can be independently adjusted.

The terminal $T_2$ corresponds to the terminal of like reference in Fig. 1 and may be connected in the same manner.

It may be pointed out that, in Fig. 5, advantage has been taken of the fact that use is not made of all possible combinations of pairs of pulses in order to simplify the circuit. Thus, for instance, the valve $V_{16}$ is used to apply pulses to both halves of the valve $V_{19}$ and to the lower half of the valve $V_{20}$. This can be done without disadvantage since these three channels are not operated simultaneously; that is to say, referring to Fig. 4, no two of the three pulse spacings 2, 6 and 8 occur simultaneously in the B set.

A circuit diagram of a receiver for use in receiving signals transmitted by the circuit of Fig. 5 is shown in Figs. 6 and 7. The received pulses are applied at $T_3$ to one end of a delay network $N_1$, which may be constituted in the same way at the network N in Fig. 1, and the valves $V_{21}$—$V_{25}$ have their suppressor grids connected to points 10—2 respectively on the delay network, these numbers as before representing the time delay in microseconds. The control grids of the valves are all connected to the point 0 on the network. The suppressor and control grids are normally biased negatively (by means not shown) to cut off their anode currents. These five valves are connected as shown to the diodes $V_{26}$, $V_{27}$ and $V_{28}$ and thence to five valves $V_{29}$—$V_{33}$. An integrating circuit CR is provided in the control grid circuit of each of the valves $V_{29}$—$V_{33}$ whereby these valves do not respond to positive pulses from the earlier stages until a predetermined number of pairs of pulses of appropriate time spacing have been received. A suitable number of pairs has been found to be about five. Each of the valves $V_{29}$—$V_{33}$ has in its anode circuit the winding of a relay, each having the reference D preceded by a number indicating the time delay of the pair of pulses to whose reception the relay will respond; the denominator indicates conventionally the number of contacts associated with the relay. In Figs. 6 and 7 the contacts are also referenced conventionally, the reference of the relay being followed by a number representing the number of the particular contact.

The received pulses are applied in a positive sense at the terminal $T_3$ and hence in a negative sense to the control grids of the five valves $V_{29}$—$V_{33}$. In the conditions shown in Figs. 6 and 7 all relays are operated, as is the case when the circuit is switched on in the absence of any received pulses. The front contacts (closed when the relays are operated) are distinguished from the back contacts by the latter being blackened. In the condition shown in Figs. 6 and 7, current is arranged to flow in the anode circuits of all the valves $V_{29}$—$V_{33}$, operating the relays in the anode circuits. Since contact 10D2 (Fig. 7) is closed relay E is operated and contact $E_1$ is opened thus preventing voltage from reaching the group of relay contacts between the contact 8D2 and the terminals numbered 1 to 12 from a source connected between the terminal marked + and earth even when contact $F_2$ closes. Since the five contacts 2D10, 4D6, 6D4, 8D3 and 10D3 are closed, relay F, which is of the delayed release type, is operated and contacts $F_1$ and $F_2$ are closed. The fact that contact $F_1$ (Fig. 6) is closed has no effect on the screen grids of the valves $V_{29}$—$V_{33}$ because contacts 2D1, 4D1, etc. are all open. A normal screen potential is therefore applied to those valves and they conduct.

Considering first the effect of the guard signal only, comprising pairs of positive pulses spaced 10 microseconds (hereinafter for shortness called signal 10), applied at $T_3$. The earlier of the pulses of the pair reaches the point 0 of the network $N_1$ and all the control grids simultaneously, but a this instant all the screen grids are still held negative by the bias upon them and have no positive pulses applied to them. At the moment when the earlier pulse reaches the point 10 in the network, however, the later pulse of the pair reaches the point 0 and hence all the control grids. Thus the valve $V_{21}$, having positive pulses applied simultaneously to its suppressor and control grids, passes anode current whilst the remaining valves $V_{22}$—$V_{25}$ remains cut off to their anodes. As soon as the appropriate number of signals 10 have arrived, the valve $V_{29}$ is cut off, releasing relay 10D. Contact 10D1 closes, thus earthing the screen grid and maintaining the valve $V_{29}$ cut off until the opening of contact $F_1$. Contact 10D2 opens and releases relay E which closes the contact $E_1$ and places the upper group of relay contacts in Fig. 7 in circuit (contact $F_2$ is closed). It is thus arranged that current is not passed to this group of relay contacts through $E_1$ and $F_2$ until they have had time to set themselves in accordance with received signals.

The group of relay contacts associated with 8D2 is thus, through the action of the guard signal, put into a condition to respond to any signals 2, 4, 6, or 8 that may have been received with the guard signal. The relay F is, as already stated, of the delayed release type and the opening of contact 10D3 does not release this relay until after a time sufficient to ensure reliable operation of "slave" relays or other responsive devices connected to the terminals numbered 1 12 on the right of the group of relays.

If, for example, the signal accompanying the guard signal is signal S (as in group 2 of Fig. 4), relay 8D releases, contact 8D1 locks the valve $V_{30}$ off, and contact 8D2 moves to the upper position shown in Fig. 7 all the other contacts in the group being in the position shown. Terminal 2 of the group of contacts is then energised. The numbering of these terminals corresponds with that of the groups in Fig. 4. It can readily be seen that any other group of pulses applied at terminal $T_3$ causes the appropriate terminal of the group of contacts in Fig. 7 to be energised. Certain of the terminals of the group of contacts are not used in the particular arrangement described. The capacity of the relay group is 16 distinct items of intelligence and in this example only 12 are required.

When the time allowed for passage of the intelligence has passed, the relay F releases opening contacts $F_1$ and $F_2$. The latter isolates the group of contacts associated with 8D2 in Fig. 7 and the former removes the earth connection from the screen grids of the valves $V_{29}$—$V_{33}$ and renders the anode circuits of these valves conducting provided that pulses have not maintained their control grids sufficiently negative to cut the valve off irrespective of their screen grid potential. In this case the relays in the anode circuits all operate and the circuit is in condition to receive further signals.

The purpose of the guard signal 10 is to ensure that the group of relay contacts associated with 8D2 in Fig. 7 is not energised if the received pulses are of an amplitude below that at which reliable operation is obtained. The valve $V_{21}$ is for this purpose adjusted in such a manner that it is less sensitive than the valves $V_{22}$—$V_{25}$. The valve $V_{29}$ will therefore not be cut off unless pulses of signal 10 having an amplitude above a predetermined value are received. Thus for weak signals the contact $E_1$ remains open.

The voltage between the terminals 1—12 of the group of relay contacts in Fig. 7 and earth may be used in any desired way to give indications or to operate controls.

It will be evident that a circuit of the same type as that shown in Figs. 6 and 7 can be used to receive signals transmitted with the arrangement of Fig. 1. If a guard channel be added to the Fig. 1 arrangement, no substantial changes in the receiver circuit are needed.

We claim:

1. A communication system comprising a transmitter and a co-operating receiver, said transmitter comprising generating means for generating a plurality of recurrent groups of intelligence-conveying pulses all of like amplitude and duration, each group being characteristic of a different item of intelligence, said groups having the same recurrence frequency, each said group comprising at least two sets of pulses, each of said sets comprising two or more recurrent pulses, said groups being distinguished by the number and time spacing of the constituent pulses of the sets thereof, the duration of each said set being small compared with the period of said recurrence, and the time spacing of the most closely spaced pulses of different sets of each of said groups being substantially smaller than said periods of recurrence and substantially larger than the duration of any of said sets, and all of said groups including in addition to said intelligence-conveying pulses a pair of guard channel pulses of a time spacing which is the same for all pairs of guard pulses but different from the time spacings of said intelligence-conveying pulses, means for selecting and transmitting a signal comprising at least one of said groups according to the intelligence to be transmitted, and said receiver comprising a plurality of channel combinations each consisting of at least one channel and each channel combination corresponding to a different item of intelligence, means for receiving said signal and for applying it to the inputs of all said channels, selective means associated with each of said channels, each such selective means being responsive to a recurrent pair of intelligence-conveying pulses of a different time spacing to activate its associated channel, indicating means for indicating the channel combinations activated, and guard means associated with one of said channels and responsive to a recurrent pair of pulses of the time spacing of said guard channel pulses and of amplitude at least equal to a predetermined value for rendering said indicating means responsive to pulses applied to said selective means.

2. A communication system according to claim 1, wherein said channel associated with said guard means has lower sensitivity than the remainder of said channels.

3. A communication system according to claim 1 wherein the pulses whose groupings are characteristic of different items of intelligence are of substantially like amplitude and wherein the guard channel pulses are of smaller amplitude.

4. A communication system comprising a transmitter and a co-operating receiver, said transmitter comprising generating means for generating a plurality of recurrent groups of pulses each characteristic of a different item of intelligence, said groups having the same recurrence frequency, each said group comprising at least two sets of pulses, each of said sets comprising two or more recurrent pulses, said groups being distinguished by the number and time spacing of the constituent pulses of the sets thereof, the duration of each said set being small compared with the period of said recurrence, and the time spacing of the most closely spaced pulses of different sets of each of said groups being substantially smaller than said periods of recurrence and substantially larger than the duration of any of said sets, means for selecting and transmitting a signal comprising at least one of said groups according to the intelligence to be transmitted, and said receiver comprising a plurality of channel combinations each consisting of at least one channel and each channel combination corresponding to a different item of intelligence, means for receiving said signal and for applying it to the inputs of all said channels, selective means associated with each of said channels, each such selective means being responsive to recurrent pairs of pulses of a different time spacing to activate its associated channel, integrating means associated with each said channel to permit activation of each channel only upon application thereto of a predetermined plurality of said pairs of pulses, and indicating means for indicating the channel combinations activated.

5. A communication system as set forth in claim 4 wherein the integrating means of the receiver comprises a capacitor associated with a leak resistor.

6. A signal transmitter comprising generating means for generating a plurality of trains of recurrent pulses of the same recurrence period, the pulses of the trains having a time displacement between them, a delay network and means for applying each said train of pulses to two points on said delay network between which the time delay is less than said time displacement and less than said recurrence period, to generate in said network from each pulse applied thereto a pair of pulses for transmission.

7. A signal transmitter comprising generating means for generating a plurality of trains of recurrent pulses of the same recurrence period, the pulses of the trains having a time displacement between them, a delay network, and selective means for applying any one of a plurality of selected pulse combinations, each consisting of at least one of said trains, to two points on said delay network between which the time delay is less than said time displacement and less than said recurrence period, to generate in said network from each pulse applied thereto a pair of pulses for transmission.

8. A signal transmitter comprising generating means for generating a plurality of trains of recurrent pulses of the same recurrence period, the pulses of the different trains having a time displacement between them, a delay network having an output terminal and a plurality of pairs of input terminals, the time delay between each such pair of input terminals being less than said time displacement and less than said recurrence period, coupling means whereby each of said trains can be applied to a different pair of said input terminals, selective means for rendering said coupling means operative and inoperative whereby the pulses fed to said network can be selected according to the nature of the intelligence to be transmitted, and means for transmitting the pulses from said output terminal.

9. A signal transmitter comprising means for generating a plurality of sets of recurrent pulses of the same recurrence period, each said set comprising at least two recurrent pulses, the time intervals between consecutive pulses in all said sets being different from one another and less than said recurrence period and the minimum time interval between pulses of different sets being greater than the maximum time interval between the pulses of any set, means for selecting from said sets a desired pulse group, each such group consisting of at least one of said sets, the said selecting means comprising a plurality of electron discharge tube switches, each connected to control the application to said transmitting means of a different one of said pairs of pulses, and means for varying a bias voltage upon an electrode of said tube to render said tube conducting and substantially non-conducting, and means for transmitting the selected group.

10. A signal transmitter according to claim 9 wherein said electron discharge tube switches are diodes.

11. In combination in a signal transmitter, generating means for generating a plurality of recurrent groups of intelligence-conveying pulses all of like amplitude and duration, each group being characteristic of a different item of intelligence, said groups having the same recurrence frequency, each said group comprising two sets of pulses, each of said sets comprising two or more recurrent pulses, said groups being distinguished by the number and time spacing of the constituent pulses of the sets thereof, the duration of each said set being small compared with the period of said recurrence, and the time spacing of the most closely spaced pulses of different sets of each said groups being substantially larger than the duration of any of said sets, and all of said groups comprising in addition to said intelligence-conveying pulses a pair of guard channel pulses of a time spacing which is the same for all pairs of guard pulses but different from the time spacings of said intelligence-conveying pulses, means for applying all of the pulses generated to a common transmitting channel and means for selecting at least one of said groups according to the intelligence to be transmitted.

12. A signal transmitter comprising generating means for generating a plurality of trains of recurrent pulses of the same recurrence period, the pulses of the trains having a time displacement between them, a delay network, a circuit for applying each said train of pulses to two points on said delay network between which the time delay is less than said time displacement and less than said recurrence period, to generate in said network from each pulse applied thereto a pair of pulses for transmission, and switch means in each said circuit for controlling the application of one of said trains of pulses to said delay network, said switch means comprising an electron discharge tube and means for varying a bias voltage upon an electrode of said tube to render said tube conducting and substantially non-conducting.

13. A signal transmitter comprising generating means for generating a plurality of trains of of recurrent pulses of the same recurrence period, the pulses of the different trains having a time displacement between them, a delay network having an output terminal and a plurality of pairs of input terminals, the time delay between each such pair of input terminals being less than said time displacement and less than said recurrence period, coupling means whereby each of said trains can be applied to a different pair of said input terminals, selective means for rendering said coupling means operative and inoperative whereby the pulses fed to said network can be selected according to the nature of the intelligence to be transmitted, said selective means comprising an electron discharge tube and means for varying a bias voltage upon an electrode of said tube to render said tube conducting and substantially non-conducting, and means for transmitting the pulses from said output terminal.

14. In combination in a signal transmitter, generating means for generating a plurality of recurrent groups of pulses, each characteristic of a different item of intelligence, said groups having the same recurrence frequency, each said group comprising two sets of pulses, each of said sets comprising two or more recurrent pulses, said groups being distinguished by the number and time spacing of the constituent pulses of the sets thereof, the duration of each said set being small compared with the period of said recurrence, and the time spacing of the most closely spaced pulses of different sets of each said groups being substantially smaller than said periods of recurrence and substantially larger than the duration of any of said sets, means for applying all of the pulses generated to a common transmitting channel, and means for selecting at least one of said groups according to the intelligence to be transmitted, said selecting means comprising a plurality of electron discharge tube switches, each connected to control the application to the common transmitting channel of a different one of the sets of pulses, and means for varying a bias voltage upon an electrode of each tube to render the tube conducting and substantially non-conducting.

15. A signal receiver comprising a plurality of channel combinations each consisting of at least one channel having an input circuit and an output circuit and each channel combination corresponding to a different item of intelligence, means for receiving a signal consisting of recurrent pairs of pulses of different time spacing less than the recurrence period of said pairs of pulses, means for applying said signal to all said input circuits, selective means associated with each channel each responsive to a recurrent pair of pulses of different time spacing to activate its associated channel, guard means associated with one of said channels, the selective means of this channel being responsive to guard channel pulses of predetermined time spacing, primary responsive means associated with each of said output circuits excepting that of the channel associated with said guard means, arranged to respond upon activation of its associated channel, a main responsive system actuated by said responsive means for producing a different response upon activation of each of said channel combinations and means actuated by said guard means for preventing actuation of said main responsive means in the absence of guard channel pulses of at least a predetermined amplitude in said signal.

16. A signal receiver comprising a plurality of channel combinations each consisting of at least one channel having an input circuit and an output circuit and each channel combination corresponding to a different item of intelligence, means for receiving a signal consisting of recurrent pairs of pulses of like amplitude and duration but of different time spacing less than the recurrence period of said pairs of pulses, means for applying said signal to all said input circuits, selective means associated with each channel each responsive to recurrent pairs of pulses of different time spacing to activate its associated channel, responsive means associated with each of said output circuits arranged to respond upon activation of its associated channel, and integrating means associated with each said channel to render said responsive means responsive only after application to each said channel of a predetermined plurality of said pairs of pulses.

17. A receiver as set forth in claim 16 wherein the integrating means comprises a capacitor associated with a leak resistor.

JOHN BARTRAM LOVELL-FOOT.
DOUGLAS OWEN HAWES.

REFERENCES CITED

The following references are of record in the file of this patent:

UNITED STATES PATENTS

| Number | Name | Date |
|---|---|---|
| 897,662 | Roberts | Sept. 1, 1908 |
| 1,708,989 | White | Apr. 16, 1929 |
| 2,140,138 | Miller | Dec. 13, 1938 |
| 2,173,170 | Kinkead | Sept. 19, 1939 |
| 2,198,901 | Boswau | Apr. 30, 1940 |
| 2,227,906 | Kellogg | Jan. 7, 1941 |
| 2,235,804 | Macalpine | Mar. 18, 1941 |
| 2,295,025 | Bowsher | Sept. 7, 1942 |
| 2,359,967 | Brown | Oct. 10, 1944 |
| 2,401,729 | Goldsmith | June 11, 1946 |
| 2,403,561 | Smith | July 9, 1946 |
| 2,406,165 | Schroeder | Aug. 20, 1946 |
| 2,409,229 | Smith | Oct. 15, 1946 |
| 2,414,265 | Lawson | Jan. 14, 1947 |
| 2,415,093 | Gerwin | Feb. 4, 1947 |
| 2,415,359 | Loughlin | Feb. 4, 1947 |
| 2,424,900 | Purington | July 29, 1947 |
| 2,449,819 | Purington | Sept. 21, 1948 |
| 2,451,812 | Desh | Oct. 19, 1948 |

FOREIGN PATENTS

| Number | Country | Date |
|---|---|---|
| 261,384 | Great Britain | Oct. 6, 1927 |